INVENTOR.
IVAN A. GREENWOOD JR.

United States Patent Office 3,159,833
Patented Dec. 1, 1964

3,159,833
HYBRID DOPPLER NAVIGATOR
Ivan A. Greenwood, Jr., Stamford, Conn., assignor to General Precision, Inc., a corporation of Delaware
Filed Nov. 30, 1961, Ser. No. 156,094
6 Claims. (Cl. 343—8)

This invention relates to Doppler radio navigators suitable for use in aircraft and more particularly to hybrid pulse-continuous wave Doppler radio navigators which provide the ground track velocity and drift angle of an aircraft.

Prior art Doppler navigation systems fall within the following three established groups: pulse Doppler, continuous wave, and frequency modulated continuous wave. Each of the different types has distinct advantages over the others. However, they each have inherent limitations and, therefore, the selection of any one system over the others is a matter of choice and may be reduced to a trade-off of advantages against disadvantages.

The pulse Doppler systems provide excellent transmitter-receiver isolation, however, they are somewhat inefficient since the transmitter has a very low duty cycle. On the other hand, pure continuous wave systems while very efficient due to the 100% duty cycle of the transmitter have very poor transmitter-receiver isolation. In addition they are troubled by reflections from nearby objects.

Frequency modulated continuous wave systems attempt to combine some of the advantages of both pulse and continuous wave systems. These systems solve the receiver-transmitter isolation problem and the problem of discrimination against nearby objects present in pure continuous wave systems on a frequency basis which bears a close resemblance to the time basis solution of these problems in a pure pulse system.

However, frequency modulated continuous wave systems employ receivers which necessarily accept and use the doppler shift of only one preselected higher order sideband of the beat between the received and the transmitted signals. This results in a relatively low spectrum utilization efficiency with respect to pure continuous wave systems since the power in the zero order sideband and all of the other higher order sidebands is wasted for all practical purposes.

The novel hybrid pulse continuous wave Doppler system disclosed herein is, like the frequency modulated continuous wave systems, in part a combination of both pulse and continuous wave systems. However, unlike the frequency modulated continuous wave systems, it retains the high efficiency inherent in the pure continuous wave systems in addition to the excellent receiver-transmitter isolation of the pure pulse systems.

According to the invention, two pairs of microwave frequencies are provided by a klystron or other microwave generator and are transmitted sequentially toward the ground from an aircraft in flight. The received Doppler shifted echo signals are continuously mixed with the microwave frequency currently being transmitted. From this information a Doppler frequency tracker determines the ground speed and drift angle or velocity vector of the transmitting aircraft. In addition, the information is utilized to maintain the relationship of the transmitted frequencies by generating a correction signal to compensate for changes in the operating characteristics of the klystron. Thus, the mixer output is maintained within a preselected narrow frequency band.

The novel system like pure pulse and frequency modulated continuous wave systems is subject to altitude holes, however, it is susceptible to correction in the same manner as pulse and frequency modulated continuous wave systems.

One object of this invention is to provide a novel Doppler navigation system which is comparable in efficiency to a pure continuous wave Doppler navigator.

Another object of the invention is to provide a novel Doppler navigation system which has receiver-transmitter isolation comparable to a pure pulse Doppler navigator.

A further object of this invention is to provide a novel microwave generator which alternately supplies two microwave frequencies.

Another object of this invention is to provide apparatus for producing a microwave signal which is periodically frequency modulated in a square wave manner between two selected microwave frequencies.

Yet another object of this invention is to provide apparatus for producing a square wave frequency-modulated microwave signal whose frequency excursion is automatically frequency controlled.

A further object of this invention is to provide a novel Doppler navigation system utilizing a single microwave generator.

The foregoing and other objects and advantages of the invention will be more apparent from a consideration of the specification and drawings.

Figure 1:
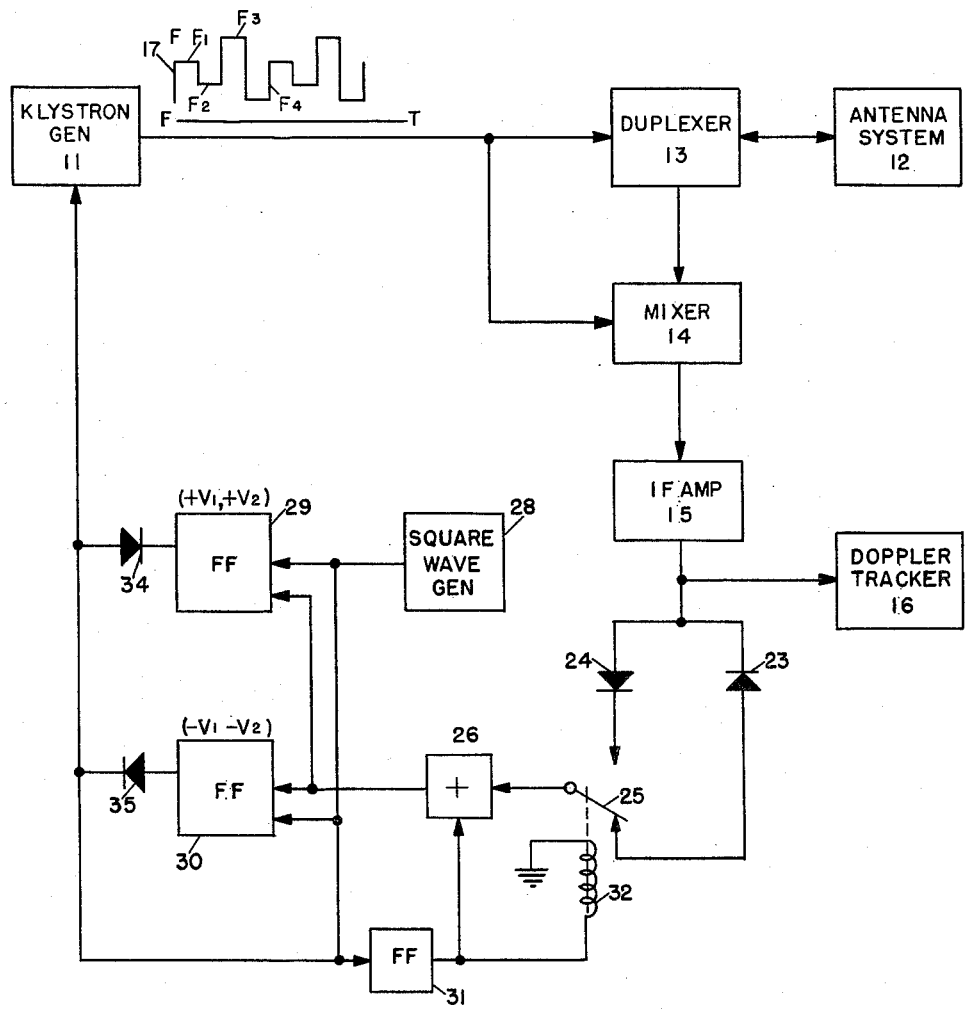
FIGURE 1 is a block diagram of a novel hybrid navigator constructed according to the invention.

In FIGURE 1, a klystron generator 11 is connected to an antenna system 12 through a duplexer 13. It is also connected to a mixer 14 which also has an input connected to duplexer 13 to receive back-scattered or reflected received radiation from antenna system 12. Thus mixer 14 provides an intermediate frequency output which is derived by mixing the Doppler shifted return signal with the generator output. This intermediate frequency signal is amplified in amplifier 15 and then applied to a conventional Doppler frequency tracker 16 which may be constructed similar to the Doppler frequency tracker shown in Patent No. 2,915,748. The output of intermediate frequency amplifier 15 may be substituted directly in the circuit of FIGURE 1 for the output of intermediate frequency amplifier 65, disclosed therein, since the output of amplifier 15 is in the same form as the output of amplifier 65. The klystron generator 11 is frequency controlled to provide frequency varying as shown in the graph 17. The repetition rate of these frequency variations may be adjusted as a function of altitude so that $f_1$ is returned and applied to mixer 14 via duplexer 13 at the same time $f_2$ is applied from klystron 11 to mixer 14. Thus the mixer output will, at that time, be (1) $\qquad (f_1 \pm \Delta F) \pm f_2$ When $f_2$ is returned the output will be (2) $\qquad (f_2 \pm \Delta F) \pm f_3$ and when $f_3$ is returned, the output of the mixer will be (3) $\qquad (f_3 \pm \Delta F) \pm f_4$ and, finally, when $f_4$ is returned, the mixer output will be (4) $\qquad (f_4 \pm \Delta F) \pm f_1$ It can be shown that these expressions are reducible to the following frequencies of interest which will be passed by intermediate frequency amplifier 15.

(1) $\qquad f_1 - f_2 \pm \Delta F$
(2) $\qquad f_3 - f_2 \pm \Delta F$
(3) $\qquad f_3 - f_4 \pm \Delta F$
(4) $\qquad f_1 - f_4 \pm \Delta F$ Of these, 2 and 4 are of no value in so far as the generation of a correction or error signal is concerned since the sums of $f_3-f_2$ and $f_1-f_4$ will not contribute to the generation of a correction signal.

Figure 2:
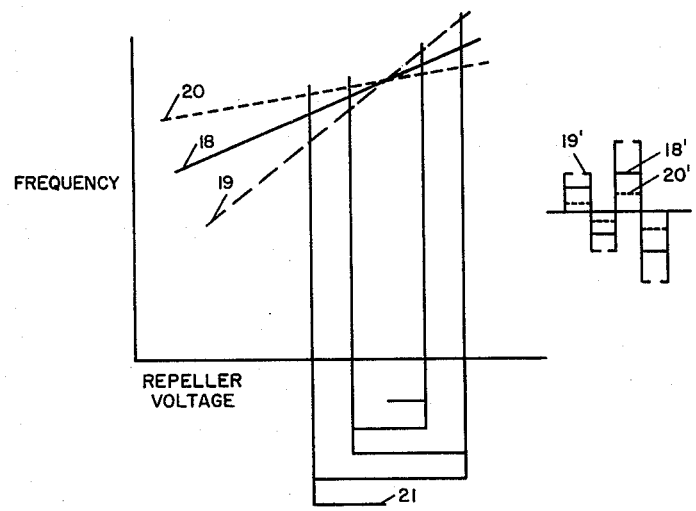
FIGURE 2 is a graph showing the operating characteristics of a klystron tube.

In FIGURE 2 the variations of the characteristics of the klystron are shown by plotting the output frequency of the klystron as a function of the klystron repeller voltage.

Three curves, 18, 19 and 20, are shown. The klystron modulating voltage applied to the repeller is shown at 21 and the output frequency for each of the three characteristics, 18, 19 and 20, are shown at 18′, 19′ and 20′.

It can be seen from the graph that a change in the klystron characteristic from 18 to 19 will produce a frequency shift in the intermediate frequency set forth in the above equations, 1 and 3, which will cause both frequencies to increase and a shift such as that shown by the curve 20 will cause both of the above said frequencies to move downward. In each instance, the frequencies set forth in Equations 2 and 4 are equal to each other and, therefore, are, as previously stated, of no value for generating the correction signal.

A pair of oppositely poled diodes 23 and 24 each have one electrode connected to the output of intermediate frequency amplifier 15. The other electrode of diode 23 is connected to one contact of a switch 25 while the other electrode of diode 24 is connected to the other contact of switch 25. The armature of switch 25 is connected to a summing circuit 26. A square-wave generator 28 provides a fixed frequency square wave which is applied to a pair of flip-flops 29 and 30. It is also applied to a flip-flop 31 which energizes a relay winding 32 to operate switch 25 at half the frequency of square-wave generator 28. The outputs of flip-flops 29 and 30 are connected by oppositely poled diodes 34 and 35 to the repeller electrode circuit of klystron 11, as is the output from square-wave generator 28.

Flip-flop 29 is triggered by the output from square-wave generator 28 and supplies two positive voltages alternately. Flip-flop 30 is also triggered by the output from square-wave generator 28 and supplies two negative voltages alternately.

Figure 4:
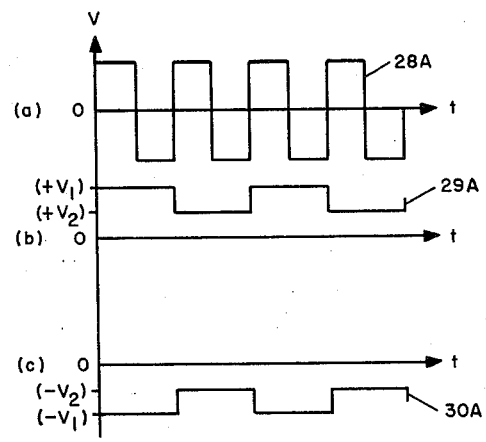
FIGURE 4 is a series of graphs showing the outputs of various circuit components.

Diode 34 provides a positive clamp on the square-wave generator output as it is applied to klystron 11 and diode 35 provides a negative clamp. This may be seen from an examination of FIGURE 4 which shows the output of flip-flop 29 at 29a, the output of flip-flop 30 at 30a, and the output of square-wave generator 28 at 28a. Here diode 34 will conduct when the voltage from square-wave generator 28 rises above the voltage of 29a, thus the maximum positive voltage applied to klystron generator 11 is limited by the output of flip-flop 29. In a similar manner diode 35 will conduct when the voltage of square-wave generator 28 falls below the voltage of 30a, thus the maximum negative voltage applied to klystron generator 11 is limited by the output of flip-flop 30 shown at 30a. It should be noted that the voltage applied to the klystron is employed to vary or modulate the frequency output of klystron generator 11 by adding to or subtracting from the repeller electrode bias voltage.

Since the frequencies of flip-flops 29 and 30 are half that of square-wave generator 28, the output wave as shown in FIGURE 2 at 21 will be obtained, since the square-wave generator output will be permitted to rise to the highest of the positive voltages from flip-flop 29 and fall to the greatest of the negative voltages from flip-flop 30 during one complete cycle, then during the next complete cycle it will be limited to the lower of the positive voltages and the lesser of the negative voltages.

The output of flip-flop 31 is applied to summing circuit 26 and a correction voltage is provided at the output of the summing circuit since during the positive half cycle of operation of flip-flop 31 the negative output of IF amplifier 15 as provided by diode 23 is compared with the positive voltage of flip-flop 31, and during the negative half cycle of flip-flop 31 the positive output of amplifier 15 as provided by diode 24 is compared with the negative voltage of flip-flop 31. If $f_1-f_2$ and $f_3-f_4$ are equally spaced above and below the center transmission frequency of amplifier 15, no error signal will be generated since the positive and negative voltages supplied by flip-flop 31 are adjusted to cancel the outputs applied to circuit 26 via switch 25 when the intermediate frequencies are equally spaced on opposite sides of the center transmission frequency. However, should these frequencies, due to a change in klystron characteristics, be shifted up or down then one will be increased in voltage and the other decreased, and depending upon the direction of the shift a correction signal will be generated having a sign and magnitude equal to the direction and magnitude of the shift. The error signal thus generated is applied to both flip-flops 29 and 30 to adjust the amplitude of the output of these flip-flops which results in an adjustment of the frequency swing of klystron 11 so that klystron 11 changes the frequency swing of its output to null the error signal by shifting the intermediate frequencies so that they are equally spaced on opposite sides of the center transmission frequency of intermediate frequency amplifier 15.

The modification shown in FIGURE 1 provides a fixed cycle of operation such as shown at 17. However, it may be desirable under certain circumstances to repeat a number of cycles of $f_1$, $f_2$ consecutively, and then an equal number of cycles of $f_3$, $f_4$ consecutively. This is impossible with the circuit shown in FIGURE 1. The embodiment shown in FIGURE 3, however, makes this possible since it substitutes a different modulating voltage generator for the modulating voltage generator shown in FIGURE 1.

Figure 3:
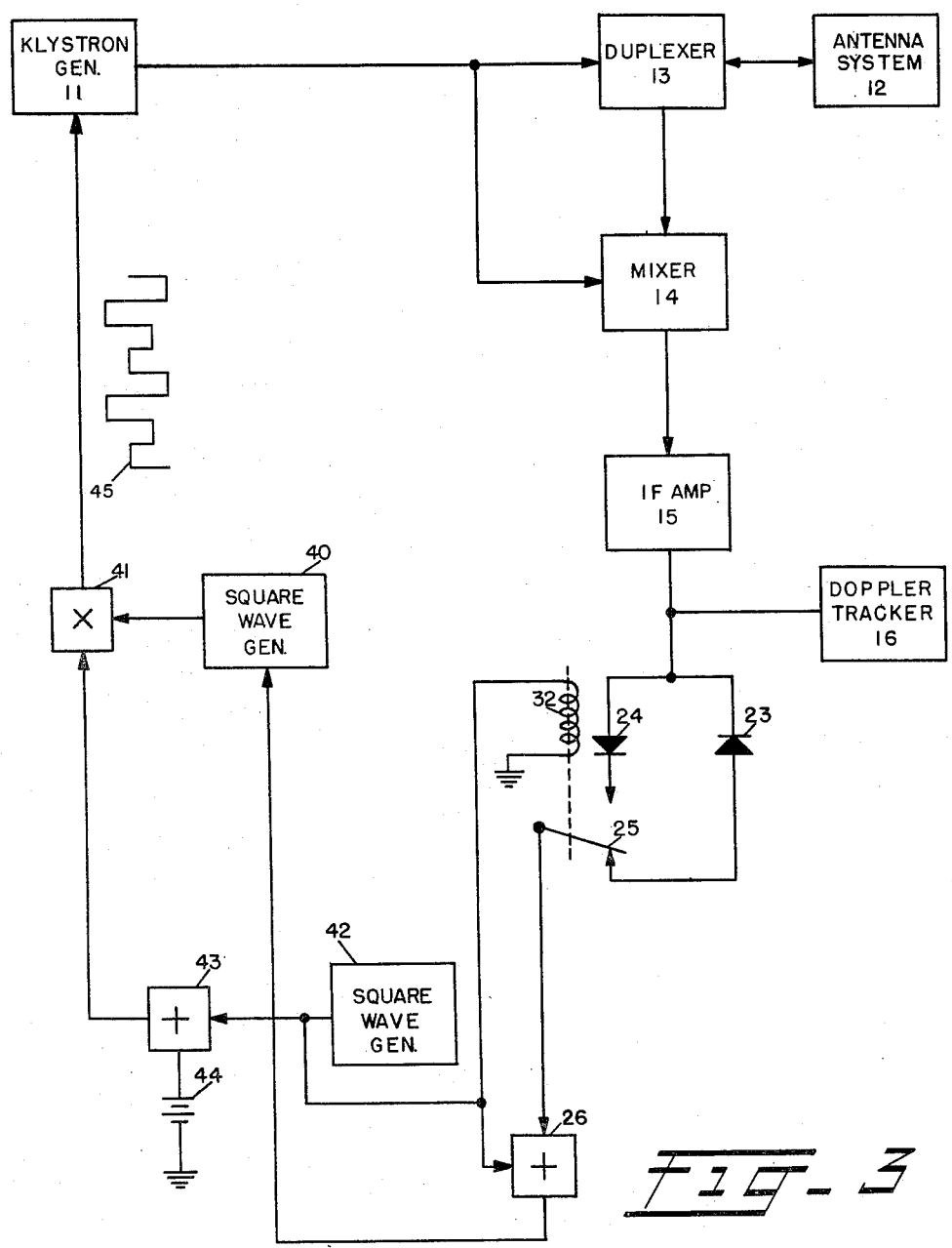
FIGURE 3 is a block diagram of a second embodiment of the invention.

In FIGURE 3 all of those elements which are identical to elements shown in FIGURE 1 bear the same reference numerals and a repetition of the description would be superfluous. Therefore the descriptions will be limited to the modulating voltage generator only.

A square-wave generator 40 has its output connected to a voltage multiplication circuit 41 and a second square-wave generator 42 has its output connected to an adding circuit 43. A D.-C. voltage source 44 is also connected to adding circuit 43 and biases the voltage output from generator 42. The biased output is applied to multiplication circuit 41 and the product of the voltage from square-wave generator 40 and the biased voltage from generator 42 is applied to the repeller electrode of klystron 11. This output is shown graphically at 45. The output of square-wave generator 42 is applied to summing circuit 26 and to relay coil 32 in the same manner as the output of flip-flop 31 of FIGURE 1. If the frequency of generator 40 is $F_1$ then the frequency of generator 42 should be made equal to $F_1/2n$ where "$n$" may be any whole number. The output shown at 45 is secured when "$n$" equals 1. For other values of "$n$" the number of cycles of $f_1$, $f_2$ and $f_3$, $f_4$ will be changed. Such a change may be advantageous in increasing the sampling period which under certain operating conditions will result in more stable operation.

While only two embodiments of the invention have been shown and described in detail for illustration purposes, it should be understood that the invention is not limited to the specific embodiments shown.

What is claimed is:

1. A Doppler radio navigator comprising, a microwave generator, control means for periodically varying the frequency of the generator output to provide more than two different frequencies which are cyclically repeated, duplexing means for connecting the microwave generator output to an antenna system and for connecting the received back-scattered energy from said antenna to a mixing means, means for connecting the microwave generator output to said mixing means, an intermediate frequency amplifier having a predetermined center band transmission frequency responsive to said mixer output, a Doppler receiver responsive to the output from said intermediate frequency amplifier for providing the velocity of the antenna along its ground track and the drift angle thereof, and means responsive to the intermediate frequency amplifier output for comparing the relative amplitudes of two preselected intermediate frequencies from said amplifier to provide an error signal indicative of the magnitude and direction of deviation of said two preselected intermediate frequencies from a preset frequency and for applying said error signal to the control means which adjusts the frequency of the microwave generator to null the error signal.

2. A Doppler radio navigator as set forth in claim 1 in which the means responsive to the mixer means output comprises a discriminator for providing a direct current output the magnitude and direction of which indicates the drift of two intermediate frequencies from said amplifier from positions equally spaced on either side of said center frequency.

3. A Doppler radio navigator as set forth in claim 2 in which the discriminator comprises a pair of oppositely poled rectifiers connected to the said intermediate frequency amplifier, a summing circuit, and switch means for alternately connecting the rectifiers to the summing circuit which provides the algebraic sum of the rectified outputs from the intermediate frequency amplifier.

4. A Doppler radio navigator comprising, a microwave oscillator, control means for periodically varying the frequency of the oscillator to provide more than two different frequencies which are cyclically repeated, duplexing means for connecting the microwave oscillator output to an antenna system and for connecting the received back-scattered energy from said antenna to a mixing means, means for connecting the microwave oscillator output to said mixing means, an intermediate frequency amplifier having a predetermined center band transmission frequency responsive to said mixer output, a Doppler receiver responsive to the output from said intermediate frequency amplifier for providing the velocity of the antenna along its ground track and the drift angle thereof, a pair of oppositely poled rectifiers connected to said intermediate frequency amplifier, a summing circuit switch, means responsive to said control means for alternately connecting the rectifiers to the summing circuit which provides the algebraic sum of the rectified outputs from the intermediate frequency amplifier, and means for applying said algebraic sum to the control means for adjusting the microwave oscillator frequencies to null the output of the summing circuit.

5. A Doppler radio navigator as set forth in claim 4 in which the control means for periodically varying the frequency of the microwave generator to provide more than two different frequencies which are cyclically repeated comprises, a fixed frequency square-wave generator, first and second flip-flops triggered by said square-wave generator, said first flip-flop alternately providing two different positive voltages, said second flip-flop alternately providing two negative voltages, a first diode connected from the output from the first flip-flop to the square-wave generator output for providing a positive clamp on the generator output, a second diode connected from the second flip-flop to the square-wave generator output for providing a negative clamp on the generator output, said means for applying the algebraic sum to the control means providing an adjustment of the amplitude of first and second flip-flops as a function of the output of the summing circuit, and means for applying the clamped square-wave generator output to the microwave oscillator.

6. A Doppler radio navigator as set forth in claim 4 in which the control means for periodically varying the frequency of the oscillator to provide more than two different frequencies which are cyclically repeated comprises, a first fixed frequency square-wave generator, a second square-wave generator having a frequency equal to the frequency of the first generator divided by $2n$ where "$n$" equals any preselected whole number, means for voltage biasing the output of said second generator, means for multiplying the voltage from said first generator by the biased voltage from said second generator, said means for applying the algebraic sum to the control means providing an adjustment of the amplitude of the first square-wave generator output as a function of the output of the summing circuit, and means for applying the product from the multiplying means to the microwave oscillator.

References Cited in the file of this patent
UNITED STATES PATENTS

| | | |
|---|---|---|
| 2,522,367 | Guanella | Sept. 12, 1950 |
| 2,923,004 | Warneske | Jan. 26, 1960 |